US012339017B2

(12) United States Patent
Kim

(10) Patent No.: US 12,339,017 B2
(45) Date of Patent: Jun. 24, 2025

(54) AIR-CONDITIONING DEVICE

(71) Applicant: LG ELECTRONICS INC., Seoul (KR)

(72) Inventor: Taekyung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 322 days.

(21) Appl. No.: 17/801,643

(22) PCT Filed: Feb. 25, 2021

(86) PCT No.: PCT/KR2021/002349
§ 371 (c)(1),
(2) Date: Aug. 23, 2022

(87) PCT Pub. No.: WO2021/172882
PCT Pub. Date: Sep. 2, 2021

(65) Prior Publication Data

US 2023/0089873 A1 Mar. 23, 2023

(30) Foreign Application Priority Data

Feb. 25, 2020 (KR) ........................ 10-2020-0023195

(51) Int. Cl.
*F24F 1/031* (2019.01)
*E06B 7/28* (2006.01)
(Continued)

(52) U.S. Cl.
CPC ................ *F24F 1/031* (2019.02); *E06B 7/28* (2013.01); *F24F 1/0071* (2019.02);
(Continued)

(58) Field of Classification Search
CPC ........ F24F 1/031; F24F 1/0071; F24F 5/0042; F24F 7/013; F24F 2013/225; F24F 2221/20; E06B 7/28
See application file for complete search history.

(56) References Cited

U.S. PATENT DOCUMENTS 4,453,456 A * 6/1984 Szkudlarek ............... E06B 7/02 160/91
2004/0121719 A1* 6/2004 Robison ............. B60H 1/00478 454/143
(Continued)

FOREIGN PATENT DOCUMENTS

JP 2005-024125 1/2005
KR 10-0213121 8/1999
(Continued)

OTHER PUBLICATIONS

KR-200297811-Y1 translation.*
International Search Report (with English Translation) dated Jun. 28, 2021 issued in Application No. PCT/KR2021/002349.

*Primary Examiner* — Elizabeth J Martin
(74) *Attorney, Agent, or Firm* — KED & ASSOCIATES

(57) ABSTRACT

An air-conditioning device is provided that includes a case having an interior divided into a first area and a second area; a barrier arranged between the first area and the second area inside of the case; an indoor blowing fan arranged in the first area; an outdoor blowing fan arranged in the second area; a first thermoelectric element including a first indoor heat exchanger arranged in the first area, and a first outdoor heat exchanger arranged in the second area; a case lower-surface formed on a lower surface of the case so as to have an open upper side to collect condensed water generated from the first thermoelectric electric element; and a second thermoelectric element arranged between the first thermoelectric element and the case lower-surface.

14 Claims, 6 Drawing Sheets

(51) Int. Cl.

| | |
|---|---|
| ***F24F 1/0071*** | (2019.01) |
| ***F24F 5/00*** | (2006.01) |
| ***F24F 7/013*** | (2006.01) |
| ***F24F 13/10*** | (2006.01) |
| ***F24F 13/20*** | (2006.01) |
| ***F24F 13/22*** | (2006.01) |
| ***F24F 13/28*** | (2006.01) |

(52) U.S. Cl.

CPC ............ *F24F 5/0042* (2013.01); *F24F 7/013* (2013.01); *F24F 13/10* (2013.01); *F24F 13/20* (2013.01); *F24F 13/224* (2013.01); *F24F 13/28* (2013.01); *F24F 2013/205* (2013.01); *F24F 2013/225* (2013.01); *F24F 2013/227* (2013.01); *F24F 2221/20* (2013.01)

(56) References Cited

U.S. PATENT DOCUMENTS

| | | | | |
|---|---|---|---|---|
| 2012/0055170 | A1* | 3/2012 | Lilke | F24H 3/0411 165/61 |
| 2020/0215548 | A1* | 7/2020 | Kernen | F25B 21/04 |
| 2021/0325052 | A1* | 10/2021 | Yang | F24F 1/028 |
| 2021/0332988 | A1* | 10/2021 | Xing | F24F 13/20 |

FOREIGN PATENT DOCUMENTS

| | | | |
|---|---|---|---|
| KR | 20-0297811 | | 12/2002 |
| KR | 200297811 | Y1 * | 12/2002 |
| KR | 10-0704393 | | 4/2007 |
| KR | 10-2008-0063576 | | 7/2008 |
| KR | 10-2014-0058069 | | 5/2014 |
| KR | 10-1530702 | | 6/2015 |
| WO | WO 2009/022778 | | 2/2009 |

* cited by examiner

AIR-CONDITIONING DEVICE

CROSS-REFERENCE TO RELATED PATENT APPLICATIONS

This application is a U.S. National Stage Application under 35 U.S.C. §371 of PCT Application No. PCT/KR2021/002349, filed Feb. 25, 2021, which claims priority to Korean Patent Application No. 10-2020-0023195, filed Feb. 25, 2020, whose entire disclosures are hereby incorporated by reference.

TECHNICAL FIELD

The present disclosure relates to an air-conditioning device or air conditioner, and more particularly, to a window type air-conditioning device to which a thermoelectric element is applied.

BACKGROUND ART

An air-conditioning device or air conditioner refers to a device that controls the temperature, humidity, the flow of air, and cleanliness of air in a specific area to suit the purpose of use.

An air-conditioning device with a temperature control function usually includes a compressor, a condenser, an expansion device, and an evaporator to cool or heat an indoor space according to a circulation direction of a refrigerant.

The air-conditioning device may include an outdoor unit installed in an outdoor space and an indoor unit installed in an indoor space. The outdoor unit may include a compressor for compressing a refrigerant, an outdoor heat exchanger for heat exchange between outside or outdoor air and a refrigerant, a blower fan, and various pipes that connect the compressor and the indoor unit. The indoor unit may include an indoor heat exchanger and an expansion valve for heat exchange between inside or indoor air and a refrigerant.

However, there were some difficulties in installing an outdoor unit at an outdoor space, such as the need for various pipes to connect an indoor unit, drilling into an outer wall for a passage through which a pipe passes, and a separate space for the outdoor unit. In addition, the outdoor space was not aesthetically pleasing.

Further, a compressor, a pump, and the like caused some problems such as power consumption of an air conditioner, excessive generation of noise and vibration, and a reduction in reliability of the product due to their complicated structures.

In order to solve these problems, window air conditioners have been released. For example, Korean Patent Publication No. 1994-0024347 (KR100213121B1), which is hereby incorporated by reference, discloses a window air conditioner to which a thermoelectric element is applied.

However, the related art is disadvantageous in that condensed water produced by condensing water vapor contained in air during cooling is accumulated or pooled inside the air conditioner, and an indoor space or room cannot be ventilated with outdoor air. Moreover, when condensed water has been stagnant for a long time or when ventilation is not done properly or adequately, it may cause bacterial growth and bad odor.

An air conditioner using a thermoelectric element is disclosed in Korean Patent Laid-Open Publication No. 10-2014-0058069 (KR20140058069A), which is hereby incorporated by reference, and Korean Patent No. 10-1530702 (KR101530702B1), which is hereby incorporated by reference.

However, the related art uses a refrigerant (water), and a pump is required accordingly, which increases power consumption in proportion to a complicated system and increases noise due to the use of the pump.

DISCLOSURE OF INVENTION

Technical Problem

It is an objective of the present disclosure to provide an air-conditioning device that can exclude an outdoor unit, a compressor, a pump, a refrigerant, a pipe, and the like, be convenient to install, and achieve indoor cooling/heating.

It is another objective of the present disclosure to provide an air-conditioning device that can effectively treat or deal with condensed water.

It is yet another objective of the present disclosure to provide an air-conditioning device that can circulate air of an indoor space by introducing air of an outdoor space into the indoor space.

The objectives of the present disclosure are not limited to the objectives described above, and other objectives not stated herein will be clearly understood by those skilled in the art from the following description.

Technical Solution

According to an aspect of the subject matter described in this application, an air-conditioning device includes: a case having an interior divided into a first area and a second area, provided with an indoor inlet and an indoor outlet to allow the first area and an indoor space to communicate with each other, and provided with an outdoor inlet and an outdoor outlet to allow the second area and an outdoor space to communicate with each other; a barrier disposed between the first area and the second area inside the case; an indoor blowing fan disposed in the first area to form a flow of air from the indoor inlet to the indoor outlet; an outdoor blowing fan disposed in the second area to form a flow air from the outdoor inlet to the outdoor outlet; a first thermoelectric element including a first indoor heat exchanger disposed in the first area to exchange heat with air passing through the first area, and a first outdoor heat exchanger disposed in the second area to exchange heat with air passing through the second area; and a second thermoelectric element disposed between the first thermoelectric element and a case lower surface to heat condensed water generated from the first thermoelectric element, allowing the condensed water generated in the first thermoelectric element to be collected/heated.

The air-conditioning device may be provided with a connection hole formed between the case lower surface and the second thermoelectric element to allow the first area and the second area to communicate with each other, so that the condensed water is distributed in both the first area and the second area. Accordingly, generated condensed water may be heated in the first area and/or the second area by the second thermoelectric element.

The second thermoelectric element may be disposed on an upper side of the connection hole, allowing the second thermoelectric element to be located more closer to the case lower surface at which condensed water is collected.

The second thermoelectric element may include a second outdoor heat exchange surface disposed to face the second area, and a second outdoor heat exchange fin protruding from the second outdoor heat exchange surface to the second area so as to heat the condensed water, thereby improving the efficiency of heat transfer from the second area to condensed water.

The second outdoor heat exchange fin may be bent downward from an end thereof to be in contact with the case lower surface, so that the second outdoor heat exchange fin may directly come into contact with condensed water to heat the condensed water.

The case lower surface may be tilted to be located lower in the second area than in the first area with respect to a ground. Accordingly, condensed water generated in the first area that cools indoor air may flow to the second area that heats outdoor air and condensed water.

The air-conditioning device may further include an exhaust tube disposed at a lower portion of the second area of the case and communicating with the case lower surface to allow the condensed water to be discharged to an outside of the case. Accordingly, the condensed water may be discharged to the outside, and a small amount of condensed water may be heated by the second thermoelectric element.

The outdoor blowing fan may be disposed between the first outdoor heat exchanger and the second thermoelectric element, allowing convective heat to be transferred to condensed water.

The air-conditioning device may further include a ventilation module installed at the barrier to allow outdoor air to be introduced into the indoor space. The ventilation module may include a ventilation hole formed in the barrier to allow the first area and the second area to communicate with each other. Accordingly, the indoor space may not only be heated/cooled but also ventilated.

The ventilation module may include a ventilation damper that opens and closes the ventilation hole, allowing outdoor air to be introduced when necessary.

The outdoor inlet, the ventilation module, and the indoor outlet may be installed at heights corresponding to each other. Thus, a flow path through which outdoor air is introduced into the indoor space may be optimized for ventilation.

The ventilation module may be disposed between the first thermoelectric element and the second thermoelectric element to evaporate condensed water through forced convection while providing a humidification function as outdoor air introduced into the indoor space is mixed with the evaporated condensed water.

The air-conditioning device may include a chassis attached to an outer surface of the case between the indoor outlet and the outdoor outlet and having a groove to be inserted into a gap of a window frame, allowing the air-conditioning device to be installed into the window frame.

The chassis may include a lower chassis integrally formed with the case to support the case and an upper chassis inserted into the lower chassis to be adjustable to increase or decrease a length thereof, allowing the air-conditioning device to be installed regardless of the size of the window frame.

The chassis may include a blocking member attached to an upper end of an inside of the upper chassis and is corrugated be adjustable to increase or decrease the length thereof, allowing the indoor space and the outdoor space to be separated from each other regardless of the size of the window frame.

Details of other embodiments are included in the detailed description and the accompanying drawings.

Advantageous Effects

An air-conditioning device of the present disclosure has one or more of the following effects.

First, as an outdoor unit, a compressor, a refrigerant, a pipe, and the like are not required, convenient installation and compactness in size may be achieved.

Second, as condensed water evaporates while cooling/heating an indoor space, the indoor space may be humidified as supply air is mixed with the evaporated condensed water.

Third, air of the indoor space may be circulated by introducing air of an outdoor space into the indoor space during heating/cooling.

The effects of the present disclosure are not limited to the effects described above, and other effects not mentioned will be clearly understood by those skilled in the art from the claims.

MODE FOR INVENTION

Figure 1:
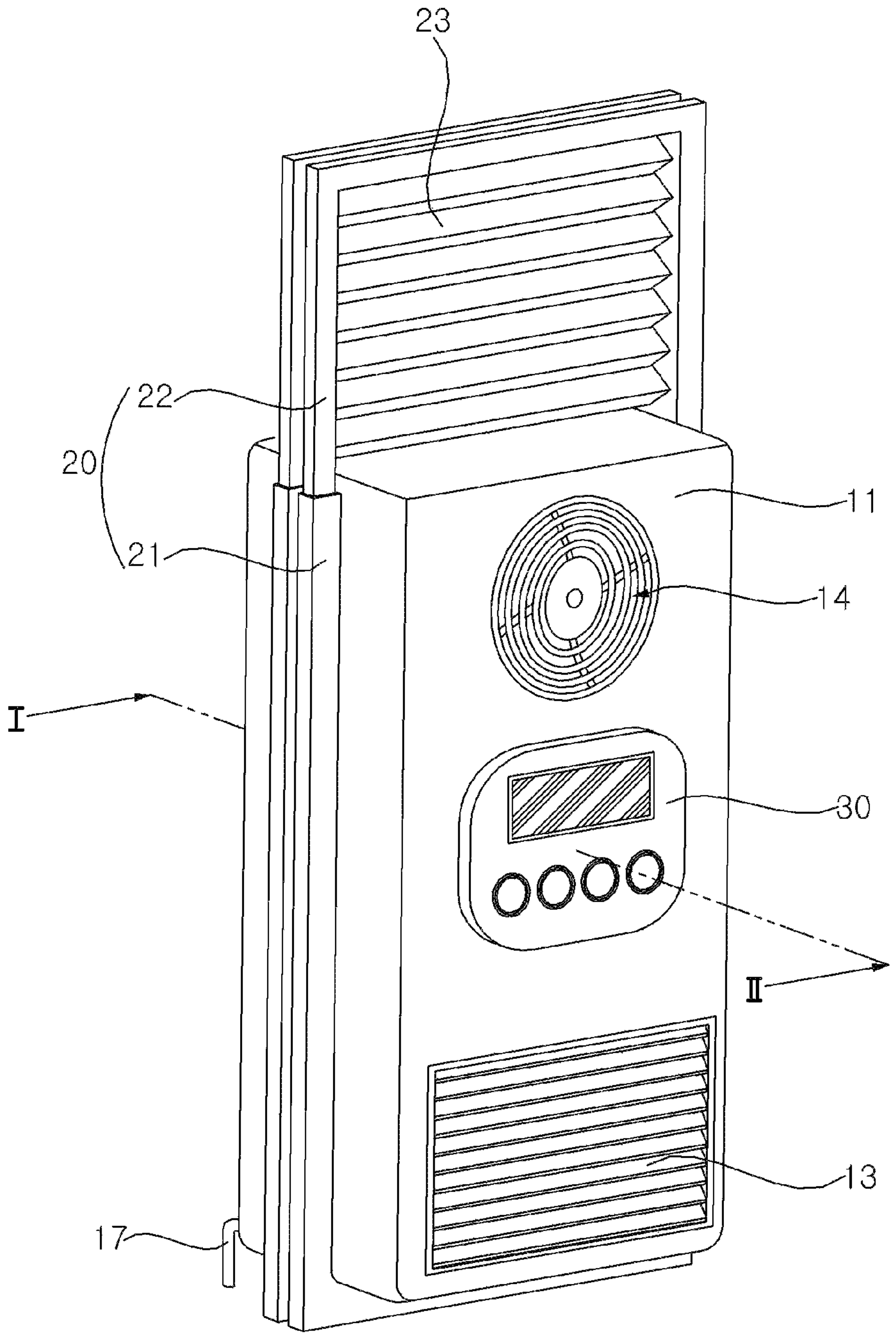
FIG. 1 is a perspective view of an air-conditioning device according to an embodiment of the present disclosure.

The above and other aspects, features and other advantages of the present disclosure will be more clearly understood from the following detailed description taken in conjunction with the accompanying drawings. Exemplary embodiments will now be described more fully hereinafter with reference to the accompanying drawings; however, they may be embodied in many different forms and should not be construed as limited to the embodiments set forth herein. Rather, these embodiments are provided so that this disclosure will be thorough and complete, and will fully convey the scope of the exemplary embodiments to those skilled in the art. The same reference numerals are used throughout the drawings to designate the same or similar components.

Spatially relative terms, such as, "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated at other orientations) and the spatially relative terms used herein interpreted accordingly.

The terminology used herein is for the purpose of describing particular embodiments only and is not intended to limit the full scope of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, and/or operations, but do not preclude the presence or addition of one or more other components, steps, and/or operations.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In the drawings, the thickness or size of each component is exaggerated, omitted, or schematically shown for the sake of convenience and clarity. Also, the size and area of each component do not entirely reflect the actual size or area thereof.

In the following description, preferred embodiments of the present disclosure will be described with reference to the accompanying drawings.

Hereinafter, the present disclosure will be described with reference to the drawings for explaining an air-conditioning device or air conditioner according to embodiments of the present disclosure.

Referring to FIG. 1, an air-conditioning device according to an embodiment of the present disclosure may include a case 11, an indoor inlet 13, and an indoor outlet 141.

The indoor inlet 13 and the indoor outlet 141 may be formed at the case 11 that defines an outer shape of the air-conditioning device. Air of an indoor space (hereinafter referred to as "indoor air") is sucked into the case 11 through the indoor inlet 13. The indoor air sucked into the case 11 is discharged to the indoor space through the indoor outlet 141. In order to allow the air to flow, the air-conditioning device may further include an indoor blowing (or blower) fan 143 to be described later. When the indoor blowing fan 143 is operated, indoor air may be introduced into the case 11 to exchange heat, and then cold or warm air may be supplied to the indoor space through the indoor outlet 141.

On an opposite side of the case 11, which is the side opposite of the side in which the indoor inlet 13 and the indoor outlet 141 are formed, an outdoor inlet 13', an outdoor outlet 141', and an outdoor blowing (or blower) fan 143' may be provided such that air of an outdoor space (hereinafter referred to as "outdoor air") is introduced into the case to be discharged to the outdoor space. This will be described later.

A chassis 20 may be provided on an outer surface of the case 11 of the air-conditioning device. The chassis 20 may have a concave-convex shape that corresponds to a shape of a window frame, so that the chassis 20 fits perfectly in the window frame when inserted. The chassis 20 may be configured to be adjustable in length (increase or decrease in length) to fit various sizes of window frames.

The air-conditioning device may further include an operation unit 30 provided with a display, a power button, an operation button, various sensors and a controller that receive and transmit signals, etc. The operation unit 30 may display various information, such as operation information of the air-conditioning device and indoor/outdoor temperature, to a user, or may control the operation of components of the air-conditioning device by receiving a user command.

Figure 2:
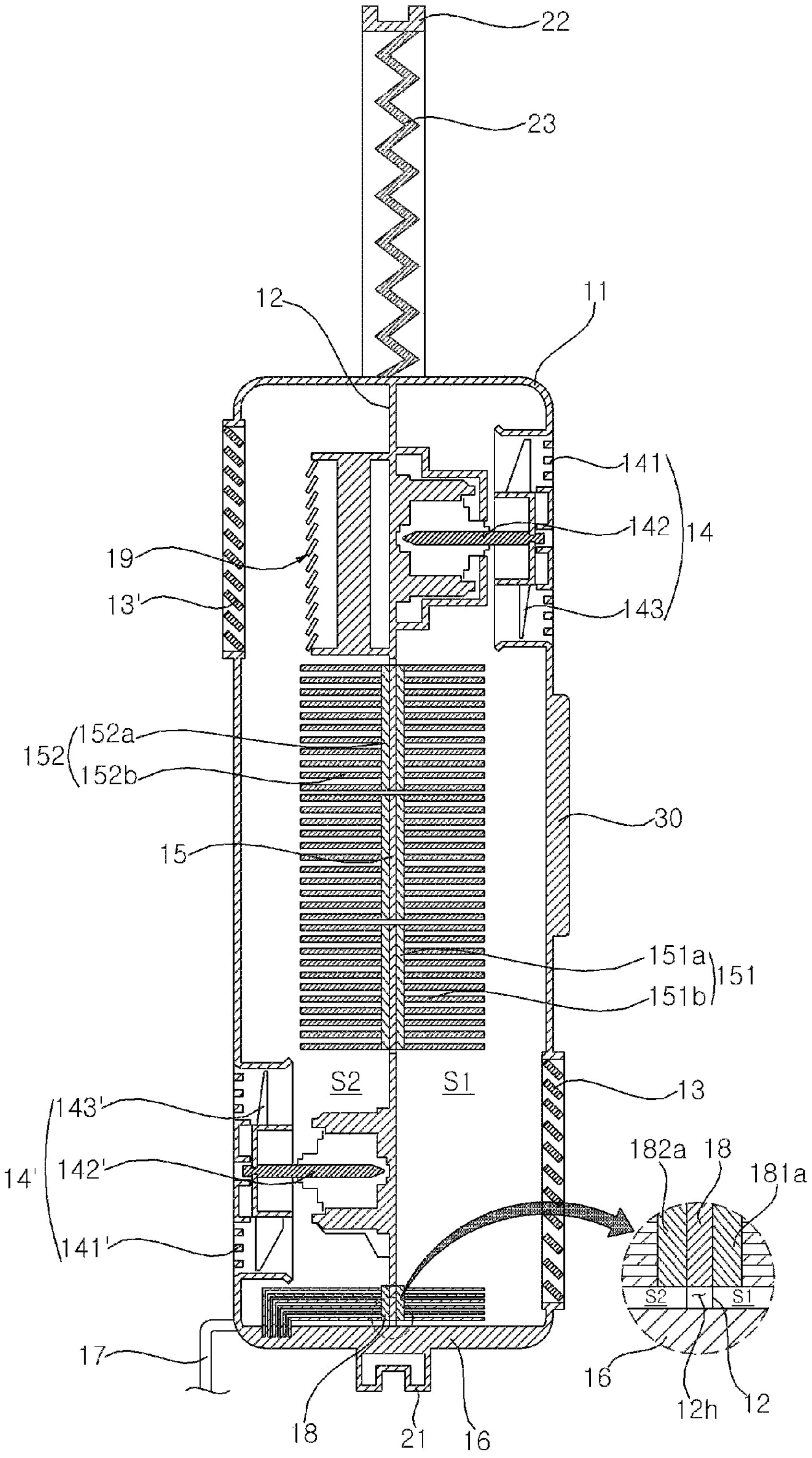
FIG. 2 is a cross-sectional view of the air-conditioning device in FIG. 1 according to the embodiment of the present disclosure, when viewed from the line I-II of FIG. 1.

Referring to FIG. 2, the air-conditioning device according to the embodiment of the present disclosure may include the case 11 having an interior or inside separated (divided) into a first area S1 and a second area S2. The case 11 may be provided with the indoor inlet 13 and the indoor outlet 141 to allow the first area S1 and the indoor space to communicate with each other. The case 11 may be provided with the outdoor inlet 13' and the outdoor outlet 141' to allow the second area S2 and the outdoor space to communicate with each other.

The first area S1 and the second area S2 divided by a barrier (or partition wall) 12 are to make distinction between an area in communication with the indoor space and an area in communication with the outdoor space. In the following description, for the sake of convenience, the first area S1 will be described as an area in communication with the indoor space, and the second area S2 will be described as an area in communication with the outdoor space. However, conversely, the first area S1 can be an area in communication with the outdoor space, and the second area S2 can be an area in communication with the indoor space.

The indoor inlet 13 may be formed at a lower part of the case 11 in the first area S1, and the indoor outlet 141 may be formed at an upper part of the case 11 in the first area S1. The outdoor inlet 13' may be formed at the upper part of the case 11 in the second area S2, and the outdoor outlet 141' may be formed at the lower part of the case 11 in the second area S2.

The air-conditioning device may include the barrier 12 disposed in the case 11 between the first area S1 and the second area S2. The barrier 12 may separate the first area S1 and the second area S2.

The air-conditioning device may include the indoor blowing fan 143 that is disposed in the first area S1 and forms a flow of air from the indoor inlet 13 to the indoor outlet 141. The air-conditioning device may include the outdoor blowing fan 143' that is disposed in the second area S2 and forms a flow of air from the outdoor inlet 13' to the outdoor outlet 141'. The indoor blowing fan 143 may be connected to a first motor 142 that provides rotational power to the indoor blowing fan. The outdoor blowing fan 143' may be connected to a second motor that provides rotational power to the outdoor blowing fan.

The air-conditioning device may include a first thermoelectric element 15 including a first indoor heat exchanger 151 disposed in the first area S1 to exchange heat with air passing through the first area, and a first outdoor heat exchanger 152 disposed in the second area S2 to exchange heat with air passing through the second area. The first thermoelectric element 15 may be disposed between the indoor inlet 13 and the indoor outlet 141. The first thermoelectric element 15 may be disposed between the outdoor inlet 13' and the outdoor outlet 141'. The first thermoelectric element 15 may be inserted into the barrier 12 to be installed.

The first thermoelectric element 15 uses the Peltier effect, which occurs when a potential difference is applied to two sides of an object, causing heat along with a current to flow from one side to the other to thereby create a temperature difference. Like a typical thermoelectric element, the first thermoelectric element 15 may include an n-type semiconductor (not shown) and a p-type semiconductor (not shown). The n-type semiconductor (not shown) and the p-type semiconductor (not shown) may be connected to the first indoor heat exchanger 151 and the first outdoor heat exchanger 152 that are conductors.

When a current is made to flow to one side, the first indoor heat exchanger 151 may emit heat, while the first outdoor heat exchanger 152 may absorb heat. When a current flows to the other side, the first indoor heat exchanger 151 may absorb heat, while the first outdoor heat exchanger 152 may emit heat. That is, depending on a direction of the current, the first area S1 may be a heating area, and the second area S2 may be a cooling area. Conversely, the first area S1 may be a cooling area, and the second area S2 may be a heating area. The air-conditioning device may include a unit or module that converts a direction of a current to enable the conversion of heating and cooling.

The first indoor heat exchanger 151 and the first outdoor heat exchanger 152 may include a first indoor heat exchange surface 151*a* of a surface shape and a first outdoor heat exchange surface 152*a* of a surface shape, respectively. The first indoor heat exchanger 151 may further include a first indoor heat exchange fin 151*b* of a fin shape attached to the first indoor heat exchange surface 151*a*. The first outdoor heat exchanger 152 may further include a first outdoor heat exchange fin 152*b* of a fin shape attached to the first outdoor heat exchange surface. As the first indoor heat exchange fin 151*b* and the first outdoor heat exchange fin 152*b* have a shape in which a plurality of fins protrude, a surface area in contact with air is increased to thereby improve the efficiency of heat exchange.

Figure 3:
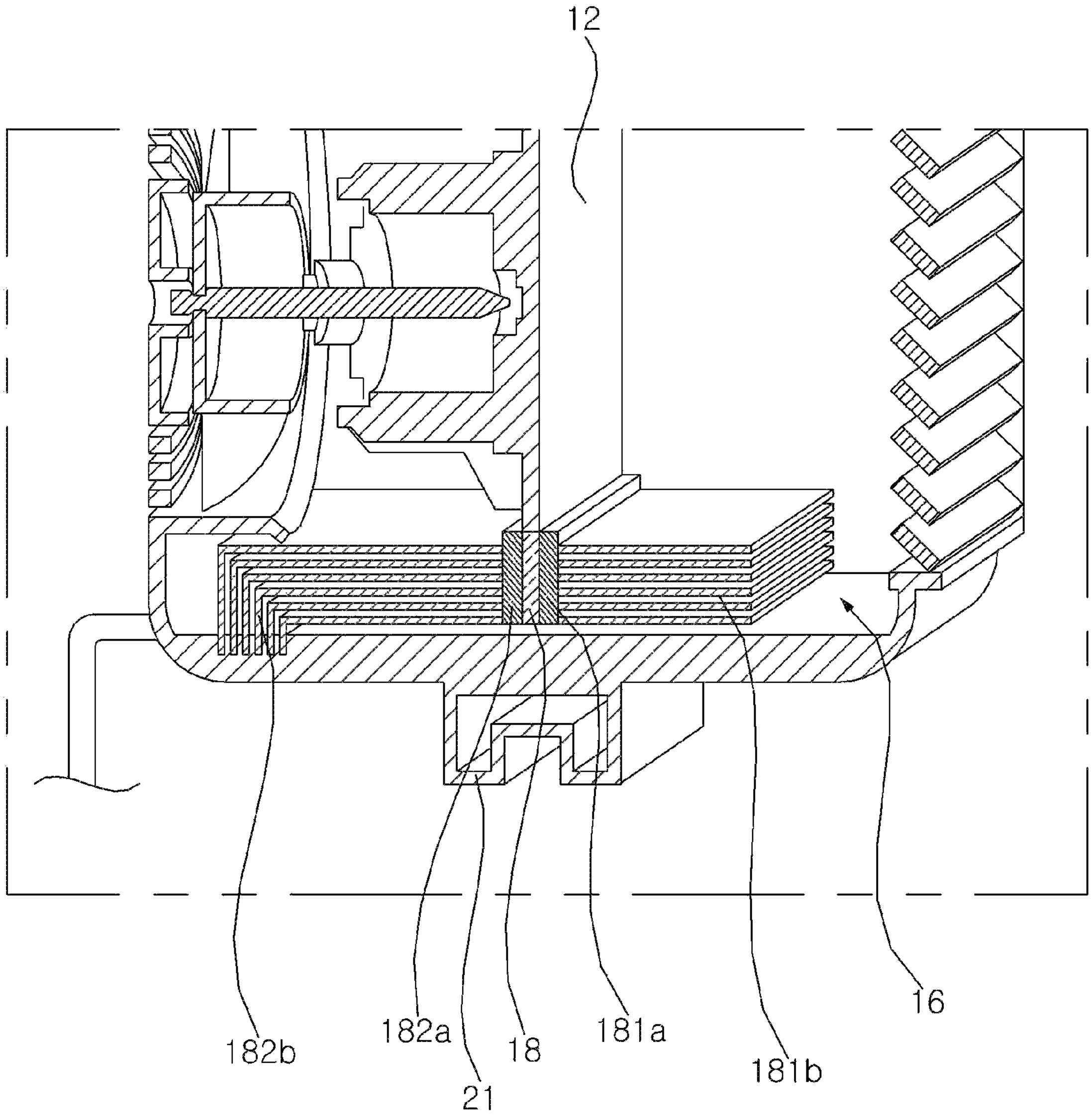
FIG. 3 is an enlarged view showing a lower part of the air-conditioning device according to FIG. 1 cut along the line I-II.

Referring to FIGS. 2 and 3, the air-conditioning device may further include a case lower surface 16 that is formed on a lower surface of the case 11 and has an upper open side to collect condensed water generated from the first thermoelectric element 15. The case lower surface 16 may collect condensed water falling from the first thermoelectric element 15. The case lower surface 16 may be integrally formed with the case 11, or may be provided separately from the case to be drawn in and pulled out.

The air-conditioning device may further include a second thermoelectric element 18 disposed between the first thermoelectric element 15 and the case lower surface 16 to heat the condensed water. The second thermoelectric element 18 may be inserted into the barrier 12 to be installed.

The second thermoelectric element 18 may include a second indoor heat exchanger 181 disposed in the first area S1 to exchange heat with air passing through the first area. The second thermoelectric element 18 may include a second outdoor heat exchanger 182 disposed in the second area S2 to exchange heat with air passing through the second area. Any one of the second indoor heat exchanger 181 and the second outdoor heat exchanger 182 may absorb heat to cool air, and the other one may emit heat to heat air and condensed water.

The air-conditioning device may have a connection hole 12*h* through which the first area and the second area, between the case lower surface 16 and the second thermoelectric element 18, communicate with each other, so as to allow condensed water to be distributed in both the first area S1 and the second area S2. As shown, the barrier 12 may extend to the case lower surface 16 to divide the first area S1 and the second area S2, and a portion of the barrier 12 may be open to define the connection hole 12*h* that connects the first area S1 and the second area S2.

Hereinafter, with reference to FIGS. 2 and 3, a cooling/heating operation process and a condensed water evaporation process of the air-conditioning device according to the embodiment of the present disclosure will be described.

Indoor Cooling Operation

When the air-conditioning device receives a cooling operation command of a user, the first motor 142 and the second motor 142', and the indoor blowing fan 143 and the outdoor blowing fan 143' rotate. A current applied to the first thermoelectric element 15 flows in a first direction. Here, the first indoor heat exchanger 151 serves to absorb heat, and the first outdoor heat exchanger 152 serves to release heat as the absorbed heat is transferred thereto.

In this case, the first area S1 may perform a similar function as an indoor unit. When the indoor blowing fan 143 rotates, air is introduced, through the indoor inlet 13, into the first area S1 inside the case 11. The introduced air is cooled through contact with the first indoor heat exchanger 151 of the first thermoelectric element 15. A blowing force of the indoor blowing fan 143 causes the cooled air to be discharged to the indoor space through the indoor outlet 141.

The second area S2 may perform a similar function as an outdoor unit. When the outdoor blowing fan 143' rotates, air is introduced into the second area S2 of the case 11 through the outdoor outlet 13'. The introduced air comes into contact with the first outdoor heat exchanger 152 of the first thermoelectric element 15 to have heat released from the first outdoor heat exchanger 152. A blowing force of the outdoor blowing fan 143' causes the air with the released heat to be discharged to the outdoor space through the outdoor outlet 141'.

Indoor Heating Operation

When the air-conditioning device receives a heating operation command of a user, the first motor 142 and the second motor 142', and the indoor blowing fan 143 and the outdoor blowing fan 143' rotate. A current applied to the first thermoelectric element 15 flows in a second direction different from that of the cooling operation command. Here, the first indoor heat exchanger 151 emits heat, while the first outdoor heat exchanger 152 absorbs heat.

In this case, the first area S1 may perform a similar function as an indoor unit. When the indoor blowing fan 143 rotates, air is introduced, through the indoor inlet 13, into the first area S1 inside the case 11. The introduced air is heated through contact with the first indoor heat exchanger 151 of the first thermoelectric element 15. A blowing force of the indoor blowing fan 143 causes the heated air to be discharged to the indoor space through the indoor outlet 141.

The second area S2 may perform a similar function as an outdoor unit. When the outdoor blowing fan 143' rotates, air is introduced into the second area S2 inside the case 11 through the outdoor outlet 13'. The introduced air is cooled through contact with the first outdoor heat exchanger 152 of the first thermoelectric element 15. A blowing force of the outdoor blowing fan 143' causes the cooled air to be discharged to the outdoor space through the outdoor outlet 141'.

The conversion of cooling and heating may be achieved by changing a direction of a current as described above, but the conversion of cooling and heating may be achieved by changing positions of the first area S1 and the second area S2 to an outdoor side and an indoor side, respectively.

Collection and Evaporation of Condensed Water

When one side of the first thermoelectric element 15 absorbs heat, moisture in air around the one side of the first thermoelectric element 15 may be condensed to form condensed water. The condensed water falls under the influence of gravity, and the case lower surface 16 may collect falling condensed water. As the first area and the second area are connected between the case lower surface 16 and the second thermoelectric element 18, condensed water collected at the case lower surface 16 may be distributed in both the first area and the second area. The condensed water collected at the case lower surface 16 evaporates when heated by the second thermoelectric element 18.

Referring to FIGS. 2 and 3, the second thermoelectric element 18 may be disposed to be adjacent to the case lower surface 16 at a lower part of the barrier 12. The second thermoelectric element 18 may be disposed at the top or on an upper side of the connection hole 12*h*. The second thermoelectric element 18 may be disposed adjacent to condensed water collected at the case lower surface 16 to thereby more effectively heat the condensed water.

The second thermoelectric element 18 may include a second indoor heat exchange surface 181*a* disposed to face the first area S1, and a second indoor heat exchange fin 181*b* that protrudes from the second indoor heat exchange surface to the second area so as to heat condensed water. The second thermoelectric element 18 may include a second outdoor heat exchange surface 182*a* disposed to face the second area S2 and a second outdoor heat exchange fin 182*b* that protrudes from the second outdoor heat exchange surface to the second area so as to heat condensed water.

Like the first thermoelectric element 15, the second thermoelectric element 18 may exchange heat with air introduced into the first area S1 and the second area S2. As the second indoor heat exchange fin 181*b* and the second outdoor heat exchange fin 182*b* have a shape in which a plurality of fins protrude, a surface area in contact with air is increased to thereby improve the efficiency of heat exchange.

An area where condensed water collected at the case lower surface 16 is shared between the first area S1 and the second area S2 is formed at a lower portion of the second thermoelectric element 18, the second thermoelectric element 18 may exchange heat with air while simultaneously heating condensed water.

For example, in the case of the indoor cooling operation, condensed water, which is generated from the first indoor heat exchange fin 151*b* and the second indoor heat exchange fin 181*b,* falls to the case lower surface 16 of the first area S1, and the condensed water is distributed from the case lower surface 16 to the second area S2. Here, condensed water distributed in the second area S2 is heated by the second outdoor heat exchange fin 182*b* of the second thermoelectric element 18 disposed in the second area S2.

For example, in the case of the indoor heating operation, condensed water, which is generated from the first outdoor heat exchange fin 152*b* and the second outdoor heat exchange fin 182*b,* falls to the case lower surface 16 of the second area S2, and the condensed water is distributed from the case lower surface 16 to the first area S1. Here, condensed water distributed in the first area S1 is heated by the second indoor heat exchange fin 181*b* of the second thermoelectric element 18 disposed in the first area S1. In this case, the heated condensed water evaporates and moves together with air flowing in the first area S1, allowing not only to heat the indoor space, but also to perform a humidification function.

The second outdoor heat exchange fin 182*b* may be bent downward from an end thereof to be in contact with the case lower surface 16. As the second outdoor heat exchange fin 182*b* is bent to be in contact with the case lower surface 16, condensed water may directly come into contact with the second outdoor heat exchange fin 182*b*. The heat exchange fin may conduct heat directly to the condensed water, allowing the condensed water to evaporate more effectively.

The case lower surface 16 may be tilted to be located lower in the second area than in the first area with respect to the ground. Here, condensed water generated in the first area by the indoor cooling operation flows to the second area and is then heated by the second outdoor heat exchange fin 182*b*.

The air-conditioning device may further include an exhaust tube 17 in communication with the case lower surface 16 to discharge condensed water to an outside of the case 11.

When the case lower surface 16 is tilted, the case lower surface may be disposed at a lower position, allowing the exhaust tube to discharge flowing condensed water to the outside of the case 11. For example, when the case lower surface 16 is tilted to be located lower in the second area than in the first area, the exhaust tube 17 may be disposed at a lower portion of the second area of the case 11. When condensed water is discharged to the outside through the exhaust tube 17, a small amount of condensed water may remain in the case lower surface 16, and this remaining condensed water evaporates when heated by the second outdoor heat exchange fin 182*b*.

The outdoor blowing fan 143' may be disposed between the first outdoor heat exchanger 152 and the second thermoelectric element 18. The outdoor blowing fan 143' may be disposed between the first outdoor heat exchanger 152 and the second outdoor heat exchanger 182. The outdoor blowing fan 143' may be disposed adjacent to the second outdoor heat exchange fin 182*b*. When the second outdoor heat exchange fin 182*b* heats condensed water during the indoor cooling operation, the outdoor blowing fan 143' causes convection between the second outdoor heat exchange fin and the condensed water, allowing the condensed water to evaporate more effectively.

Hereinafter, the configuration and operation of a ventilation module of the air-conditioning device according to the embodiment of the present disclosure will be described with reference to FIGS. 2 and 4.

Figure 4:
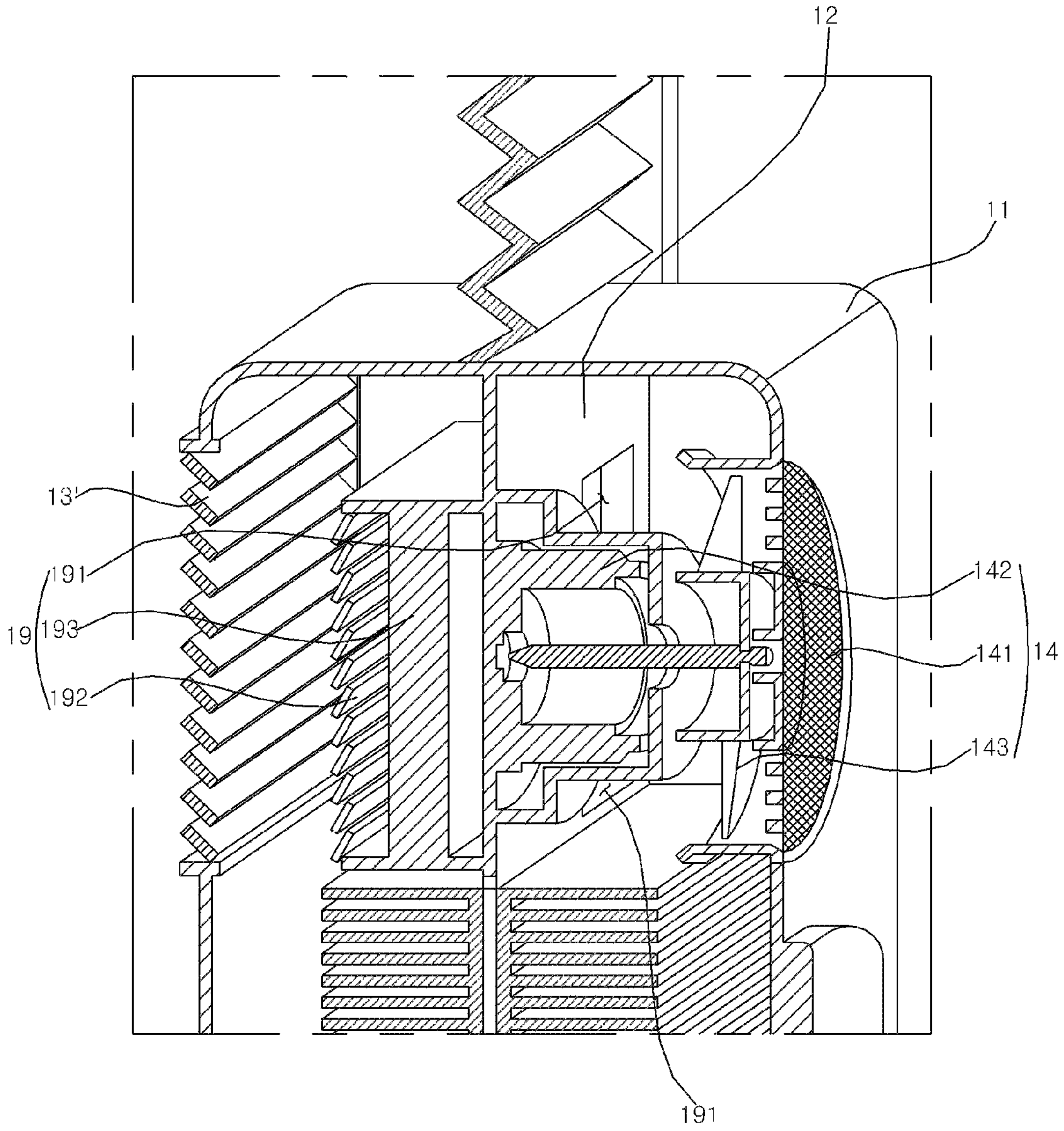
FIG. 4 is an enlarged view showing an upper part of the air-conditioning device according to FIG. 1 cut along the line I-II.
Figure 5:
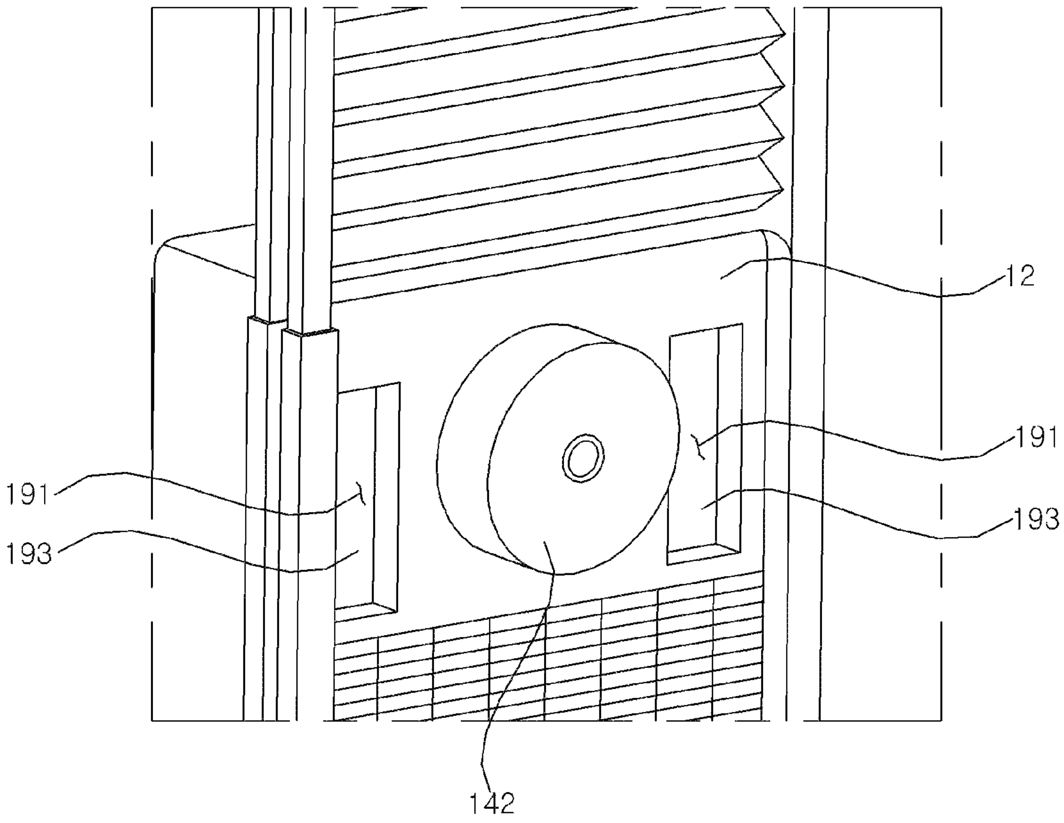
FIG. 5 is an interior view showing an upper part of the air-conditioning device according to FIG. 1.

Referring to FIGS. 2, 4, and 5, the air-conditioning device may further include a ventilation module 19 installed at the barrier 12 to allow outdoor air to be introduced into the indoor space. The ventilation module 19 may include a ventilation hole 191 formed in the barrier 12 to allow the first area and the second area to communicate with each other. The ventilation module 19 may include a ventilation damper 192 that opens and closes the ventilation hole 191. The ventilation module 19 may ventilate the indoor space by opening or closing the ventilation damper 192, when necessary, to introduce outdoor air into the indoor space during the heating/cooling operation of the air-conditioning device.

When the ventilation damper 192 is open, the indoor blowing fan 143 may rotate such that outdoor air as well as indoor air are introduced into the case 11. Outdoor air may be introduced into the case 11 through the outdoor inlet 13'. A blowing force of the indoor blowing fan 143 causes the outdoor air introduced into the case 11 to sequentially pass through the ventilation hole 191 of the ventilation module 19 and the indoor outlet 141 to be supplied to the indoor space. When the ventilation damper 192 is closed, air does not pass from the ventilation hole 191, and accordingly, only indoor air, excluding outdoor air, is introduced into the case 11 as the indoor blowing fan 143 rotates.

When the indoor blowing fan 143 and the outdoor blowing fan 143' are simultaneously operated and the ventilation damper 192 is open, in order to allow outdoor air to effectively flow into the indoor space, outdoor air introduced into the case 11 should be discharged to the indoor outlet 141 through the ventilation module 19 before being discharged to the outdoor outlet 141'. For the effective inflow of outdoor air, the ventilation module 19 may be disposed between the outdoor inlet 13' and the indoor outlet 141. In addition, a distance from the outdoor inlet 13' to the indoor outlet 141 may be less than a distance from the outdoor outlet 141' to the indoor outlet 141.

The outdoor inlet 13', the ventilation module 19, and the indoor outlet 141 may be installed at heights corresponding to each other. The ventilation hole 191 of the ventilation module may be formed at a height corresponding to the indoor outlet 141. The outdoor inlet 13', the ventilation module 19, the indoor blowing fan 143, and the indoor outlet 141 may be installed at heights corresponding to each other. The ventilation hole 191 may be formed at a height where the first motor 142 and the indoor blowing fan 143 are installed at the barrier 12.

The ventilation module 19 may include a filter 193 disposed between the ventilation hole 191 and the ventilation damper 192. The filter 193 may be disposed such that outdoor air passes therethrough before being discharged to the indoor outlet 141 as the ventilation damper 192 is open.

The indoor outlet 141 may be formed at the upper part of the case 11. When the indoor outlet 141 is provided at the upper part of the case 11, cold air in the indoor space may circulate better.

Hereinafter, a structure in which the air-conditioning device according to the embodiment of the present disclosure is fitted into a window opening will be described with reference to FIGS. 1 and 2.

Referring to FIGS. 1 and 2, the air-conditioning device may include the chassis 20 that is attached to the outer surface of the case 11 between the indoor outlet 141 and the outdoor outlet 141', and is inserted into a gap or opening of a window frame. The chassis 20 may be attached to the outer surface of the case 11 between the indoor inlet 13 and the outdoor outlet 13'. The chassis 20 may be elongated in a longitudinal direction of the case 11. The chassis 20 may be disposed at a position corresponding to the barrier 12.

The chassis 20 may be fastened to a window, namely, a gap of a window frame. When the chassis 20 is inserted into the window frame, the first area S1 may be located indoors, and the second area S2 may be located outdoors. Conversely, when the chassis 20 is inserted into the window frame, the first area S1 may be located outdoors, and the second area S2 may be located indoors. Here, a structure of the area located indoors serves as an indoor unit, and a structure of the area located outdoors serves as an outdoor unit.

The chassis 20 may be configured to be adjustable in length (increase or decrease in length) to fit various sizes of window frames. For example, the chassis 20 may include a lower chassis 21 integrally formed with the case 11 to support the case 11 and an upper chassis inserted into the lower chassis 21 to be adjustable in length. Conversely, the lower chassis 21 may be inserted into the upper chassis 22. The lower chassis 21 may be fixed to the case 11 to support lower and side portions of the case. The upper chassis 22 may be pulled out from the lower chassis 21 to allow the length of the chassis 20 to be extended. The upper chassis 22 may be pulled out from the lower chassis 21 in the longitudinal direction of the case 11. The chassis 20 may be configured to be adjustable in vertical width, as shown, or adjustable in horizontal width.

Meanwhile, when the length of the chassis 20 is extended as the upper chassis 22 is pulled out from the lower chassis 21, a space is created between an upper surface of the case 11 and the upper chassis, so that the indoor space and the outdoor space may not be blocked. Accordingly, the chassis 20 may include a blocking member 23 that is attached to an upper end of an inner side of the upper chassis 22 and is corrugated to be adjustable in length (increase or decrease in length). The blocking member 23 may be attached to the upper end of the inner side of the upper chassis 22 and an upper end surface of the case 11. The blocking member 23 may have a zigzag shape.

Figure 6:
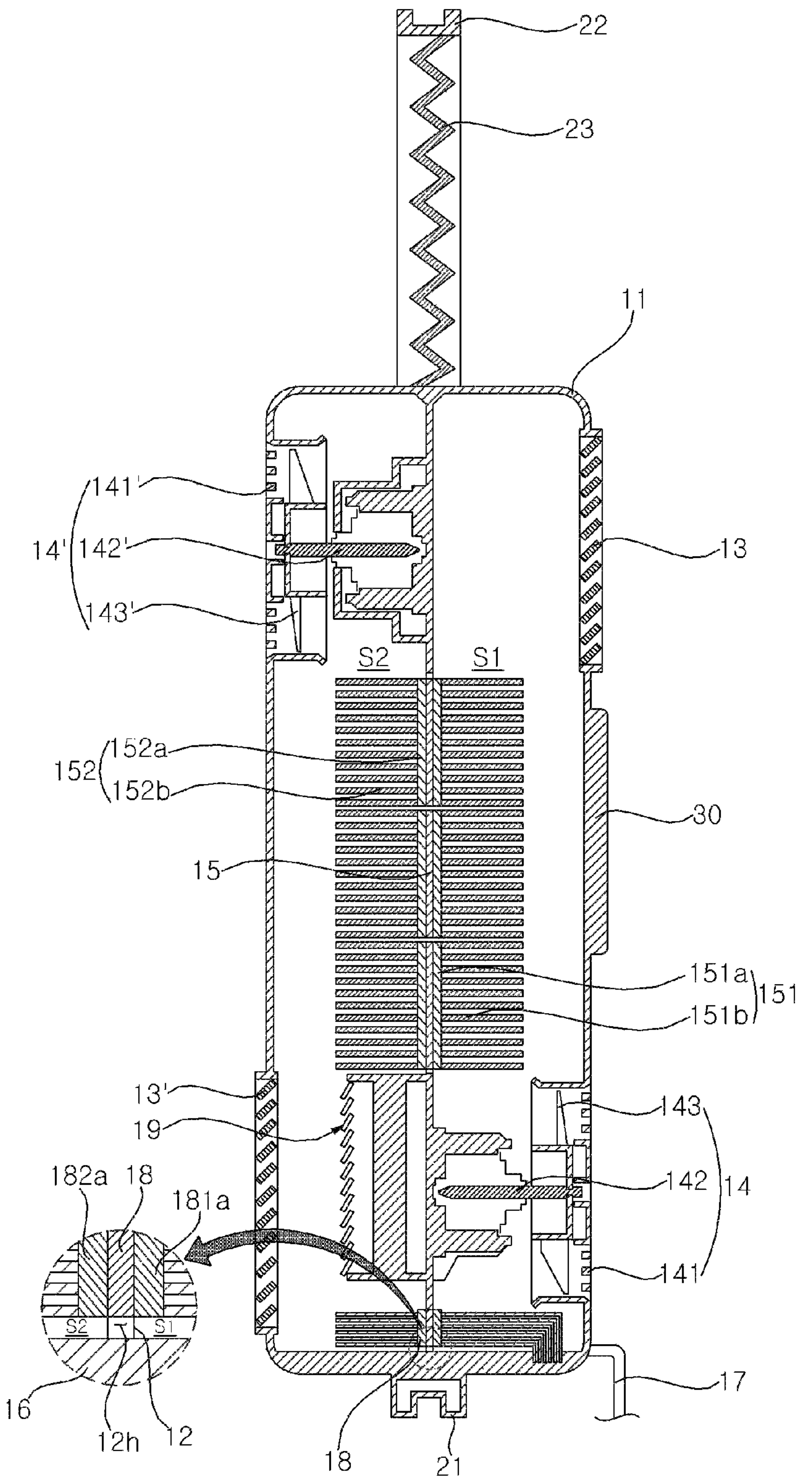
FIG. 6 is a cross-sectional view of an air-conditioning device according to another embodiment of the present disclosure.

Hereinafter, an air-conditioning device according to another embodiment of the present disclosure will be described with reference to FIG. 6. The air-conditioning device according to this embodiment of the present disclosure shown in FIG. 6 has features in common with the air-conditioning device according to the previous embodiment of the present disclosure shown in FIG. 2. A description will be given based on differences from the embodiment of FIG. 2.

An indoor inlet 13 may be formed at an upper part of a case 11 in a first area S1, and an indoor outlet 141 may be formed at the upper part of the case 11 in the first area S1. An outdoor inlet 13' may be formed at the upper part of the case 11 in a second area S2, and an outdoor outlet 141' may be formed at the lower part of the case 11 in the second area S2.

A second indoor heat exchange fin **182*b* of a second thermoelectric element 18 may be bent downward to be in contact with a case lower surface 16. When the second indoor heat exchange fin 181*b* is bent to be in contact with the case lower surface 16, condensed water may directly come into contact with the second indoor heat exchange fin 181*b***. The heat exchange fin may conduct heat directly to the condensed water, allowing the condensed water to evaporate more effectively.

The indoor outlet 141 and/or an indoor blowing fan 143 may be disposed at a lower portion of the case in the first area S1. The indoor outlet 141 and/or the indoor blowing fan 143 may be disposed adjacent to the second indoor heat exchange fin **181*b* of the second thermoelectric element 18. The indoor blowing fan 143 and/or the indoor outlet 141 may be disposed between a first indoor heat exchanger 151 and the second thermoelectric element 18. The indoor blowing fan 143 and/or the indoor outlet 141 may be disposed between the first indoor heat exchanger 151 and the second indoor heat exchange fin 181*b*. Therefore, heated air passing through the indoor outlet 141 during the indoor heating operation, causes convection between the second indoor heat exchange fin 181*b*** and condensed water, allowing the condensed water to evaporate more effectively and providing the effect of humidifying the indoor space with evaporated condensed water.

For example, in the case of the indoor heating operation, condensed water, which is generated from a first outdoor heat exchange fin **152*b* and a second outdoor heat exchange fin 182*b*, falls to the case lower surface 16 in the second area S2, and the condensed water is distributed from the case lower surface 16 to the first area S1. Here, condensed water distributed in the first area S1 is heated by the second indoor heat exchange fin 181*b* of the second thermoelectric element 18** disposed in the first area S1. In this case, the heated condensed water evaporates and moves together with air flowing in the first area S1, allowing not only to heat the indoor space, but also to perform a humidification function.

The case lower surface 16 may be tilted at a predetermined angle to be located lower in the first area than in the second area. Here, condensed water generated in the second area by the indoor heating operation flows to the first area and is then heated by the second outdoor heat exchange fin 182*b*. In this case, an exhaust tube 17 may be disposed at a lower portion of the second area of the case 11. When condensed water is discharged to the outside through the exhaust tube 17, a small amount of condensed water may remain in the case lower surface 16, and this remaining condensed water evaporates when heated by the second indoor heat exchange fin 181*b*.

For the effective introduction or inflow of outdoor air, the outdoor inlet 13', a ventilation module 19, and the indoor outlet 141 may be installed at heights corresponding to each other. That is, the ventilation module 19 may be installed at a lower part of the barrier 12. The ventilation module 19 may be disposed adjacent to the second thermoelectric element 18. The ventilation module 19 may be disposed between the first thermoelectric element 15 and the second thermoelectric element 18. Here, in the indoor heating operation, as outdoor air passing through the ventilation module 19 causes convection between condensed water and the second thermoelectric element 18, the condensed water may evaporate more effectively. In addition, outdoor air introduced through the ventilation module 19 may have evaporated condensed water more easily to thereby increase the effect of humidification.

Although preferred embodiments of the present disclosure have been shown and described herein, the present disclosure is not limited to the specific embodiments described above. It will be understood that various modifications and changes can be made by those skilled in the art without departing from the idea and scope of the present disclosure as defined by the appended claims. Therefore, it shall be considered that such modifications, changes, and equivalents thereof are all included within the scope of the present disclosure.

The invention claimed is:

1. An air-conditioning device, comprising:

a case having an interior divided into a first area and a second area, provided with an indoor inlet and an indoor outlet to allow the first area and an indoor space to communicate with each other, and provided with an outdoor inlet and an outdoor outlet to allow the second area and an outdoor space to communicate with each other;

a barrier disposed between the first area and the second area inside of the case;

an indoor blowing fan disposed in the first area to form a flow of air from the indoor inlet to the indoor outlet;

an outdoor blowing fan disposed in the second area to form a flow of air from the outdoor inlet to the outdoor outlet;

a first thermoelectric element comprising a first indoor heat exchanger disposed in the first area to exchange heat with air passing through the first area, and a first outdoor heat exchanger disposed in the second area to exchange heat with air passing through the second area; and a second thermoelectric element disposed between the first thermoelectric element and a case lower surface to heat condensed water generated from the first thermoelectric element, wherein a connection hole through which the first area and the second area communicate with each other is formed between the case lower surface and the second thermoelectric element, so that the condensed water is distributed in both the first area and the second area, wherein the second thermoelectric element is disposed at an upper side of the connection hole, wherein the second thermoelectric element comprises:

a second outdoor heat exchange surface disposed to face the second area; and a second outdoor heat exchange fin that protrudes from the second outdoor heat exchange surface to the second area so as to heat the condensed water, and wherein the outdoor blowing fan is disposed between the first outdoor heat exchanger and the second outdoor heat exchange fin.

2. The air-conditioning device of claim 1, wherein the second outdoor heat exchange fin is bent downward at one end thereof to be in contact with the case lower surface.

3. The air-conditioning device of claim 1, further comprising an exhaust tube that is disposed at a lower portion of the second area of the case and communicates with the case lower surface to allow the condensed water to be discharged to an outside of the case.

4. The air-conditioning device of claim 1, further comprising an exhaust tube in communication with the case lower surface to allow the condensed water to be discharged to an outside of the case.

5. The air-conditioning device of claim 1, further comprising a ventilation module installed at the barrier to allow outdoor air to be introduced into the indoor space, wherein the ventilation module comprises:

a ventilation hole formed in the barrier to allow the first area and the second area to communicate with each other; and a ventilation damper that opens and closes the ventilation hole.

6. The air-conditioning device of claim 5, wherein the ventilation module is disposed between the outdoor inlet and the indoor outlet.

7. The air-conditioning device of claim 6, wherein a distance from the outdoor inlet to the indoor outlet is less than a distance from the outdoor outlet to the indoor outlet.

8. The air-conditioning device of claim 5, wherein the outdoor inlet, the ventilation module, and the indoor outlet are installed at heights corresponding to each other.

9. The air-conditioning device of claim 5, wherein the ventilation module is disposed between the first thermoelectric element and the second thermoelectric element.

10. The air-conditioning device of claim 5, wherein the ventilation module comprises a filter disposed between the ventilation hole and the ventilation damper.

11. The air-conditioning device of claim 1, wherein the indoor outlet is formed at an upper portion of the case.

12. The air-conditioning device of claim 1, further comprising:

a chassis attached to an outer surface of the case between the indoor outlet and the outdoor outlet, and configured to be inserted into a gap of a window frame.

13. The air-conditioning device of claim 12, wherein the chassis comprises:

a lower chassis integrally formed with the case to support the case; and an upper chassis inserted into the lower chassis to be adjustable to increase or decrease a length thereof.

14. The air-conditioning device of claim 13, wherein the chassis comprises a blocking member attached to an upper end of an inside of the upper chassis and is corrugated to be adjustable to increase or decrease the length thereof.

* * * * *